United States Patent [19]

Chamberlin

[11] Patent Number: 4,715,507
[45] Date of Patent: Dec. 29, 1987

[54] ELECTRICAL JUNCTION BOX WITH MANIPULATABLE ENDS

[76] Inventor: James C. Chamberlin, S. 3912 Bernard, Spokane, Wash. 99203

[21] Appl. No.: 46,108

[22] Filed: May 5, 1987

[51] Int. Cl.⁴ .............................................. H02G 3/08
[52] U.S. Cl. ..................................... 220/3.94; 174/53
[58] Field of Search ...................... 220/3.94, 3.92, 3.7, 220/3.2; 174/53

[56] References Cited

U.S. PATENT DOCUMENTS

| | | | |
|---|---|---|---|
| 948,438 | 2/1910 | Ziegler et al. | 220/3.92 |
| 1,672,263 | 6/1928 | Kruse | 220/3.94 |
| 2,552,400 | 5/1951 | Brunia | 220/3.94 |
| 2,848,134 | 8/1958 | Carlson | 220/3.94 |
| 2,881,940 | 4/1959 | Hamilton | 220/3.94 |
| 2,887,525 | 5/1959 | Lewus | 220/3.94 X |
| 4,165,010 | 8/1979 | Nattel | 220/3.94 |

*Primary Examiner*—Steven M. Pollard
*Attorney, Agent, or Firm*—Keith S. Bergman; Leon Gilden

[57] ABSTRACT

A junction box for electrical outlets provides a "U" shaped body defined by vertical side walls and a rear wall. Top and bottom horizontal end walls are pivotally secured to the rear wall by end tabs extending through slots defined in the rear wall adjacent its upper and lower edges. Protuberances and tabs formed by both side walls releasably secure the end walls in operative position therebetween. The "U" shaped body has resilience to flex outwardly to enable the end walls to pivot inwardly in the box to aid placement of electrical conduit.

7 Claims, 7 Drawing Figures

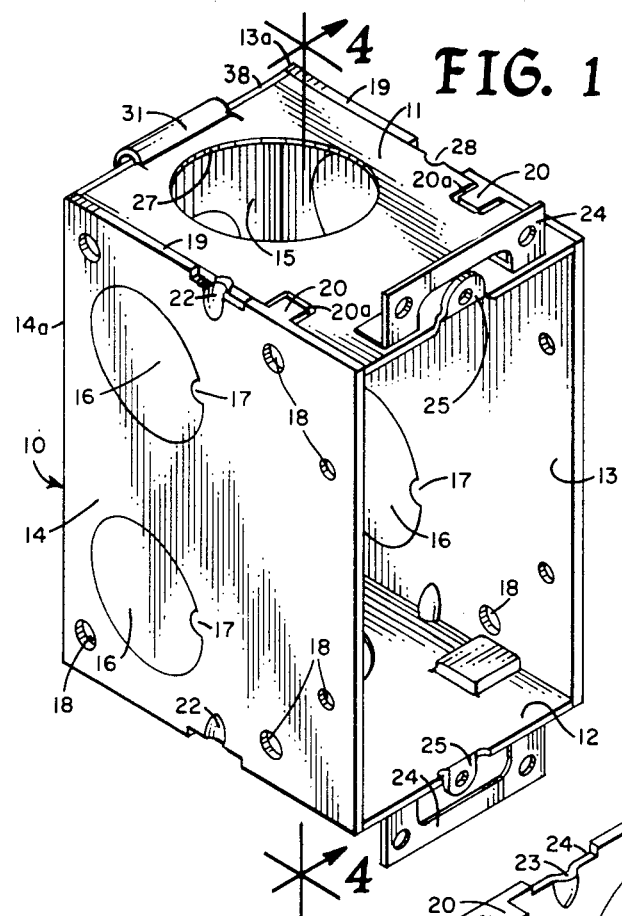
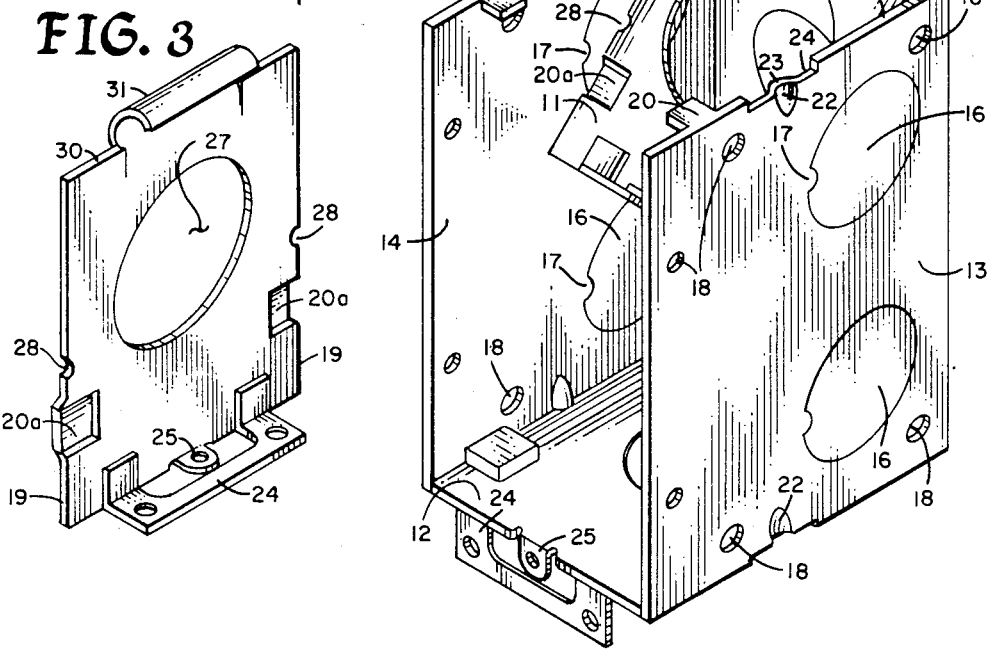
FIG. 1
FIG. 2
FIG. 3

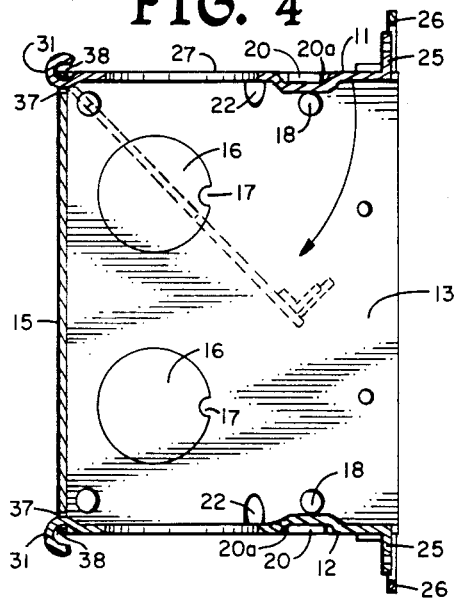
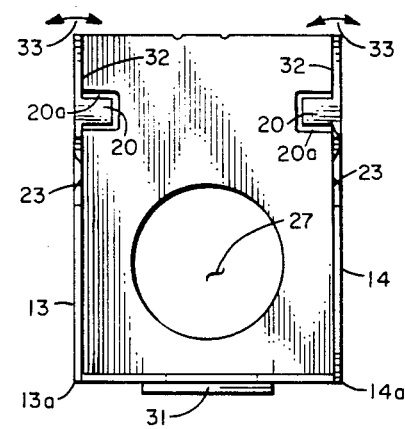
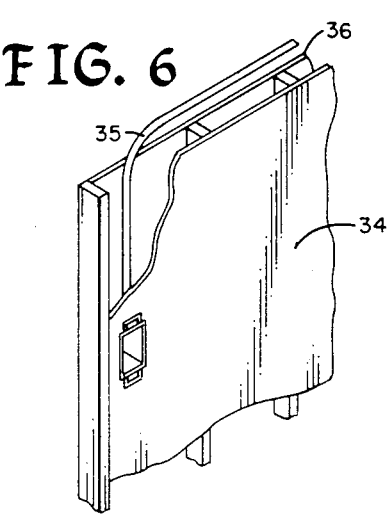
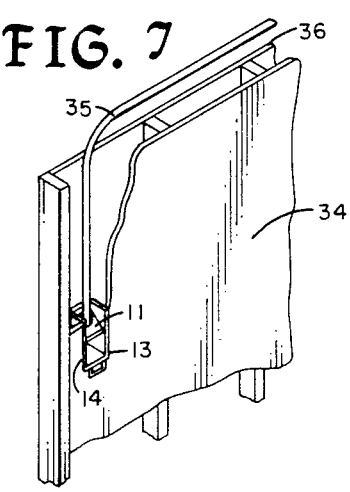

ELECTRICAL JUNCTION BOX WITH MANIPULATABLE ENDS

II. BACKGROUND OF INVENTION

IIA. RELATED APPLICATIONS

There are no applications for patent relating hereto heretofore filed in this or any foreign country.

IIB. FIELD OF INVENTION

My invention relates generally to electrical junction boxes and particularly to a partially disassembliable box with manipulatable ends for use in renovation construction to assist connecting conduit within the box.

IIC. DESCRIPTION OF THE PRIOR ART

The use of junction boxes for electrical outlets, switches and connections is standard in the electrical art. Such boxes are normally secured to existing building structural elements and have a plurality of pre-scored knockout holes formed in various surfaces of the box for passage of electrical conduit. Various tab elements and holes are formed by or secured to such boxes to enable attachement to various structural elements. Further means normally are formed in junction boxes to enable joining of a plurality of such boxes for acceptance of complex electrical components.

The electrical construction trade has in the past recognized a need for disassembliable junction boxes to permit improved access to a box's interior when installed. Junction boxes in this category commonly have been formed with detachable side elements so the normally vertical sides of the box may be removed for convenience of positioning various electrical elements therein. Movable sides of these boxes have employed various securing and fastening elements such as screws, cams, indentations, protuberances and the like to assist disassembly and reassembly.

Shortcomings of these prior art junction boxes have become apparent, however, when used in remodeling applications, and particularly in commercial remodeling environments where an existing structure or building is to be modified for future service and use. Typically the sequence of remodeling construction involves modification of mechanical systems and interior structural elements, such as walls, often with relocation and reorientations within the confines of an existing structure. Subsequently an electrical worker is called upon to run wiring and position electrical switch outlets and junctions as required. This often involves cutting of access holes in wall surfaces for insertion of electrical boxes and a securing of these boxes to convenient structural elements such as wall surfaces or studding, for example. The size of access holes so cut is often limited, especially as by the commercially available face plates that are secured over the outlet or junction boxes to cover such holes. Holes cut unduly large would require a mechanic to return and patch such holes thereby adding to the cost of such remodeling.

A working area for an electrical worker within an existing wall structures is therefore limited by the size of access holes. Further compounding working space restrictions is the mandated use in much of commercial remodeling of stiff, bulky flex cable as mandated by building code requirements to insure adequate electrical ground and conductor protection. This flex cable is normally secured to a junction box at top and bottom end portions because the electrical cable normally is fed to the box from above, and occasionally from below, between vertically positioned wall studs. Electrical wiring is a labor intensive, costly operation and the manipulation of relatively stiff and bulky flex cable in a confined area is not only awkward but also time consuming and raises costs in the already costly field of remodeling. My new and improved junction box simplifies wiring procedures and accordingly helps reduce costs of electrical work, especially as in remodeling.

As opposed to prior art devices, my junction box provides a generally "U" shaped body formed by integrally connected rear and side walls. Top and bottom end walls are pivotally connected to the rear wall and secured in position between side walls by opposed cooperating projections and tabs to align and maintain the end walls. In use the side walls are manipulated to expand the "U" shaped body laterally so that top and bottom end walls may pivotally pass between respective projections to an inwardly position in the box. Because of the natural elastic resiliency of material used to fabricate my box, the side walls will be biased and spring back to their original position when released. With either end wall pivoted inwardly, flex cable may be positioned within the box through holes they define and thereafter the end wall may be pivoted outwardly into locking position to thereby capture the cable within a conventional opening formed in the end wall. To assist in the alignment and positioning of either top or bottom wall as they are pivotally moved past fastening projections to locking position, recesses may be formed in the side edges to cooperate with such protuberances to maintain alignment of a pivotal wall as it is moved.

Heretofore movable and removable walls have been known in junction boxes, however, there has not been a convenient, economic, and efficient manner of providing top and bottom end walls that can be manually manipulated to pivot into and out of a locked position without the aid of auxiliary fastening means, such as threaded connectors and the associated tools required for their functioning.

My invention resides not in any one of these features per se, but rather in the synergistic combination of all of them as herein disclosed and claimed and it is distinguished from the prior art in this particular combination of all of its structural features that necessarily provide the functions specified and claimed.

III. SUMMARY OF INVENTION

My invention in general provides a junction box with top and bottom end walls pivotal interiorly of said box into and out of a normally locked horizontal position. My improved box is of conventional configuration and dimension with vertical height exceeding its horizontal width. Box surfaces define pre-scored knock-out elements for the acceptance of electrical conduit. Box walls provide structures to facilitate box use.

Side and rear walls are integrally formed into a "U" shaped body. Top and bottom end walls are pivotally joined to the rear wall by arcuate tabs extending rearwardly and projecting through slots defined in proximate ends of the rear wall. The top and bottom end walls are maintained in exacted position by cooperating protuberances defined by the side walls proximate their top and bottom edges. The "U" shaped body is formed of rigid material with sufficient elastic resiliency to permit manual spreading of the side walls to enable inward pivoting of top and bottom end walls into the area normally defined by end and side walls.

The two end elements and various recesses and protuberances are similarly formed with mirror symmetry for ease of manufacture and interchangeability of parts.

In creating such a device, it is:

A principal object of my invention to create a conventionally configured electrical junction box with manually manipulatable top and bottom end wall elements that are pivotal inwardly of the box from a normally locked position upon manual flexing of the box sides.

Another object of my invention to create such an improved junction box whose top and bottom end walls are pivotally connect to a common rear wall by arcuate tabs projecting rearwardly of the end walls through slots defined in said rear wall.

A further object of my invention form such a junction box with inwardly projecting protuberances formed in the box sides and overlying tabs integrally secured to the side wall vertical end edges to releasably capture the box's top or bottom end walls in a normally locked position.

A further object of my invention to provide protuberances and tabs symmetrically about the side walls of the outlet box to aid ease of manufacture and allow use of similar end elements at both box ends.

Another object of my invention to form recesses within opposed side edges of top and bottom end walls of my junction box to cooperatively align and guide the end walls in movement over the convex surface of protuberances on the side walls.

Another object of my invention to form a box with conventional orifices and brackets to aid in securing the box to structural elements or to other boxes, punch-out elements to enable access of electrical conduit within said box, and wall plate tabs for the attachment of cover plates thereto.

A still further object of my invention to provide such a box that is of new and novel design, of rugged and durable nature, of simple and economic manufacture and one otherwise well suited to the uses and purposes for which it is intended.

Other and further objects of my invention will appear from the following specification and accompanying drawings which form a part thereof.

In carrying out the objects of my invention, however, it is to be understood that its essential features are susceptible of change in design and structural arrangement with only one practical and preferred embodiment being illustrated in the accompanying drawings and specification as is required.

IV. BRIEF DESCRIPTION OF DRAWINGS

In the accompanying drawings which form a part hereof and wherein like number of references refer to similar parts throughout:

FIG. 1 is a left isometric view of my invention in normal assembled mode showing its various parts, their configuration and relationship.

FIG. 2 is a right isometric view of my invention in partially disassembled mode showing its various parts, their configuration and relationship from this aspect.

FIG. 3 is an isometric view of a typical end wall of my invention.

FIG. 4 is an orthographic, vertical cross-sectional view of the box of FIG. 1, taken on the line 4—4 thereon in the direction indicated by arrows and further illustrates in phantom line an end wall pivoted inwardly as allowed by my invention.

FIG. 5 is an orthographic top view of my box illustrating the manner of spreading of the side walls.

FIG. 6 is an isometric view illustrating my box positioned within an existing structural wall.

FIG. 7 is an isometric view of my box positioned in an existing structural wall that is partially cut-away to illustrate the top end wall of the box pivoted inwardly to accommodate an electrical conduit for subsequent attachment thereto.

V. DESCRIPTION OF THE PREFERRED EMBODIMENT

My invention comprises generally an electrical junction box formed as a "U" shaped body 10 comprising vertical rear wall 15 integrally joined to vertical side walls 13 and 14 and top and bottom end wall 11 and 12 pivotally connected to the rear wall and releasably securable to the side walls by spaced cooperating protuberances 20 and tab 22.

The "U" shaped body is formed by the structural joiner of right and left side walls 13 and 14 to rear wall 15 along rear vertical edges 13a and 14a respectively. Preferably, the side and rear walls may be of unitary one-piece construction. Knock-out elements 16 are formed in the peripheral surfaces of the box in conventional form and manner. Such knock-out elements enable selective access of electrical wiring and conduits to the interior of the box. They are typically formed with partially scored, frangible hinge portions 17 that secure elements 16 in place until force is applied to such punch out elements, whereupon hinge portions 17 will break enabling removal of the elements to provide desired openings. Attachment holes 18 defined in planar sides 13 and 14 aid joinder of several outlet boxes or securement of a box to support structure, as desired.

Formed immediately inwardly adjacent top and bottom horizontal terminal edges 19 of vertical side walls 13 and 14, are projecting tabs 20 directed inwardly in an overlying abutting relationship to end walls 11 and 12. Preferably indentations 20a are defined in the end walls to receive the tabs so that the tabs do not project outwardly of the box periphery. Spaced inwardly along horizontal edges 19 of vertical side walls 13 and 14 at a distance substantially equal to the thickness of end walls 21 are protuberances 22, each formed with an abutment surface 23 to secure or capture a respective end wall 11, 12 between projecting tabs 20 and surfaces 23. Protuberances 22 may be stamped at predetermined positions from horizontal edges 19 or formed along a horizontal recess 24, as illustrated in FIG. 1, for ease of manufacture. It should be noted that these protuberance may take the form of any suitable projection spaced below tabs 20 to perform a like function and remain within the ambit of the instant invention. Such structure could take the form of separate elements welded onto sides 13 and 14 for example.

FIG. 3 illustrates one of a pair of typical top or bottom horizontal end walls utilized by the instant invention. Tabs 26, upstanding from an exterior surface of an end wall to enable attachment of an outlet box to a support surface, are secured by common joining technics such as welding. Secured in similar fashion are conventional wall plate tabs 25 for the mechanical attachment of cover plates (not shown) for covering a box once installed. Further illustrated is a typical access opening 27 with its knock-out element removed. Recessed guides 28 are defined along side edges 29 of end walls 11 and 12 to direct end motion as discussed in more detail in describing the operation of the apparatus.

Fastening tabs 31 project outwardly and upwardly from rear edges 30 of end walls 11 and 12. These tabs are preferably formed with a curvilinear shape as illustrated in FIG. 3, but they may be of other shape such as planar or angular to serve the same purpose. The tabs might form a closed loop, if desired, and remain within the ambit of my invention. the fastening tabs are accommodated in elongate rear wall slots 37 defined immediately inwardly adjacent rear wall end edges 38. These slots 37 are configured to slidingly accept tabs 31 to form a pivotal connection between the rear wall and end walls 11 and 12 and thereby enable the end walls to pivot inwardly relative to body 10.

In operation the junction box of my invention, as seen in reference to FIGS. 6 and 7, is positioned within a selected portion of forward wall 34 through an opening cut therein. As is conventional through custom and usage in the building and remodeling trades, smaller end walls 11 and 12 normally are horizontally oriented, with side walls 13 and 14 vertically orientated. Use of attachment holes 18 allows a series of junction boxes to be secured together, if desired, by appropriate fastening means, as heretofore well known in the art. A length of conduit 35, as illustrated, is threaded between pre-exiting rear wall 36 and forward wall 34 to a position of relative proximity to the junction box of my invention. Because of the inherent resiliency of the "U" shaped body 11, an operator may now reach within the confines of the opening in wall 34 and manually spread side walls 13, 14 away from each other, as shown by arrows 33 in FIG. 5, by applying an outwardly directed force to at least one interior surface 32 of the side walls. The side walls are thusly flexed outwardly a distance to unseat an end wall 11 or 12 from protuberance surfaces 23. Thereupon an end wall may be pivoted inwardly, as illustrated in FIG. 4, about the hinge formed by fastening tab 31 carried in its associated cooperating slot 37 in rear wall 15. With an end wall thusly pivoted inwardly, a workman may now more easily manipulate the end of a stiff and cumbersome shielded conduit into the interior of my junction box 10 through adjacent access opening 27. The adjacent end wall is then manually pivoted upwardly into its initial captured position to secure conduit 35 within access opening 27 and accordingly extending within the interior confines of my junction box 10, as illustrated in FIG. 4. To assist in an end wall's return to its normal or original captured position, guide recesses 28 maintain alignment of an end wall with respect to a side wall as recesses 23 will ride in a complementary fashion over respective protuberances 28 and flex side walls 13 and 14 outwardly as an end wall is forced back into its original normal position. Side walls move back into a normal relaxed position, as illustrated in FIGS. 1, 4 and 5, by reason of their elastic resiliency to capture the end wall once again in a position between upper surfaces 23 of protuberances 22 and projecting tabs 20 when the end wall is appropriately positioned.

It may readily be seen therefore that the junction box of the instant invention is configured to position conduit, and particularly armored cable, within the confines of my box as set forth, with a minimum of effort and in a limited working space. Extraneous fastening elements and tools are not utilized or needed by the instant invention.

It will be further noted that the junction box of my invention is symmetrically formed both end for end and side for side for ease of use and economy of manufacture.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by Letters Patent, and what I claim is:

1. An electrical junction box, formed with vertical side walls joined to a common rear wall and horizontal end walls pivotal thereto, wherein said electrical box comprises:
   said side walls integrally joined to said rear wall forming a "U" shaped body,
   said end walls each formed with a pivotal connection to said rear wall to enable pivoting of said end wall inwardly relative to said side and rear walls, and
   fastening means carried by said side walls for releasably securing the end walls in a first position forming a box and permitting the pivotal motion of the end walls relative to the side walls to a second position with said "U" shaped body when said fastening means release said end walls.

2. An electrical junction box as set forth in claim 1 wherein said latch means is formed of plural cooperating pairs of projections integrally secured to said side walls and positioned to project interiorly of said "U" shaped body and each cooperating pair of projections are spaced apart a distance to accept the end walls therebetween.

3. An electrical junction box as set forth in claim 2 wherein each side wall has secured thereto a pair of said projections proximate each upper and lower vertical edge.

4. An electrical junction box as set forth in claim 3 wherein each pair of said projections comprises a tab secured to a vertical edge surface of a respective side wall and a cooperating protuberance spaced vertically from said tab along a respective side wall a distance to substantially approximate a thickness of an associated end wall.

5. An electrical junction box as set forth in claim 1 wherein said end walls are formed with recesses on opposing side edge portions, said recesses positioned to engagingly cooperate with respective projections on the side walls to guide said end walls relative thereto when said end walls pivot relative to said projections.

6. An electrical junction box as set forth in claim 1 wherein each wall surface has removable knock-out elements formed therein to accommodate electrical components associated therewith.

7. An electrical junction box as set forth in claim 1 wherein said pivotal connection further comprises:
   a tab member secured to at least one of said end walls and,
   a slot member defined in said rear wall positioned to accept each tab member so secured.

* * * * *